United States Patent
Maggard

(10) Patent No.: US 7,763,149 B2
(45) Date of Patent: Jul. 27, 2010

(54) SOLAR PHOTOCATALYSIS USING TRANSITION-METAL OXIDES COMBINING $D^0$ AND $D^6$ ELECTRON CONFIGURATIONS

(75) Inventor: Paul A. Maggard, Holly Springs, NC (US)

(73) Assignee: North Carolina State University, Raleigh, NC (US)

(*) Notice: Subject to any disclaimer, the term of this patent is extended or adjusted under 35 U.S.C. 154(b) by 1013 days.

(21) Appl. No.: 11/506,699

(22) Filed: Aug. 18, 2006

(65) Prior Publication Data

US 2007/0039814 A1 Feb. 22, 2007

Related U.S. Application Data

(60) Provisional application No. 60/709,533, filed on Aug. 19, 2005.

(51) Int. Cl.
C07C 1/00 (2006.01)
B01J 19/08 (2006.01)

(52) U.S. Cl. .................... 204/157.15; 502/261; 502/308

(58) Field of Classification Search ............ 204/157.15; 422/186; 502/261, 308
See application file for complete search history.

(56) References Cited

U.S. PATENT DOCUMENTS

| | | | |
|---|---|---|---|
| 6,384,144 B1 | 5/2002 | Mecking | |
| 6,537,379 B1 | 3/2003 | Vajo et al. | |
| 2002/0090738 A1 | 7/2002 | Cozzette et al. | |
| 2003/0042126 A1 | 3/2003 | Nguyen et al. | |
| 2003/0091500 A1 | 5/2003 | Koinuma et al. | |
| 2003/0121543 A1 | 7/2003 | Gratzel et al. | |

FOREIGN PATENT DOCUMENTS

| | | |
|---|---|---|
| JP | 11-217303 | 2/2001 |
| JP | 11-333825 | 6/2001 |
| JP | 2001-323392 | 5/2003 |

OTHER PUBLICATIONS

International Search Report, PCT/US2006/032487, Jun. 9, 2007.
Irvine J T S, et al. Solar energy fixation of carbon dioxide via cadmium sulphide and other semiconductor photocatalysts. Solar Energy, vol. 45, No. 1 (1990), pp. 27-33.
Kato H, et al. Highly efficient water splitting into $H_2$ and $O_2$ over lanthanum-doped $NaTaO_3$ photocatalysts with high crystallinity and surface nanostructure. J. Am. Chem. Soc., vol. 125 (2003), pp. 3082-3089.

*Primary Examiner*—Walter D Griffin
*Assistant Examiner*—Cameron J Allen
(74) *Attorney, Agent, or Firm*—Myers Bigel Sibley & Sajovec, P.A.

(57) ABSTRACT

A method of carrying out a catalytic reaction with a catalytic reaction system comprising octahedral-based structures, such as a solid-solution or an ordered layered material, with specific early and late transition metals are described. A late transition metal is included in the solids so that a greater amount of solar energy can be absorbed by the catalytic reaction system and the solar efficiency of the method is increased. Catalytic compounds and compositions for carrying out the method are also described.

39 Claims, 2 Drawing Sheets

Energy band diagrams for $NaTaO_3$ (left), and for a combined $d^0$ and $d^6$ metal oxide (right). Late transition-metal d-orbital splittings and band energy requirements are shown.

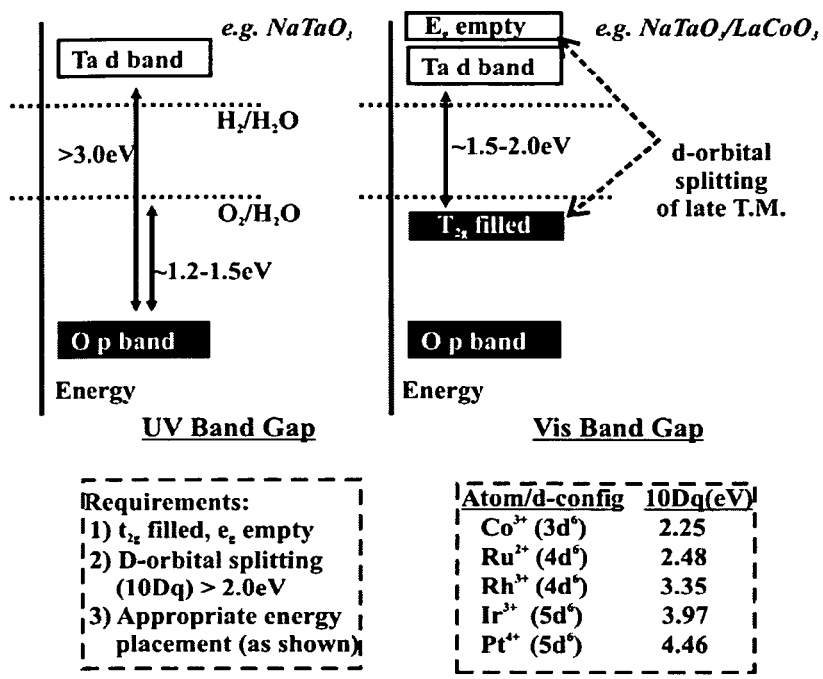
Figure 1. Energy band diagrams for $NaTaO_3$ (left), and for a combined $d^0$ and $d^6$ metal oxide (right). Late transition-metal d-orbital splittings and band energy requirements are shown.
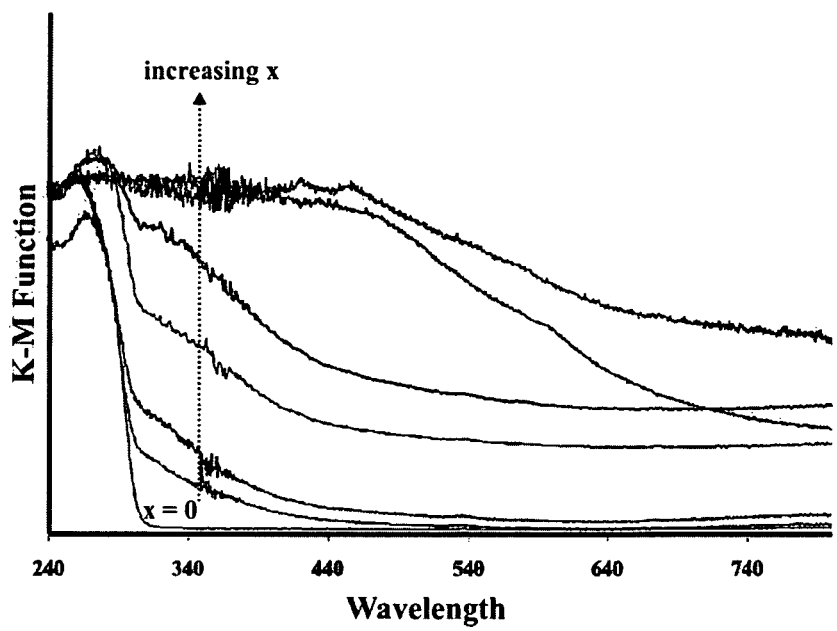
Figure 2. Diffuse reflectance data for the $(NaTaO_3)_{1-x}(LaCoO_3)_x$ series. Visible-light absorption increases with x, or Co.

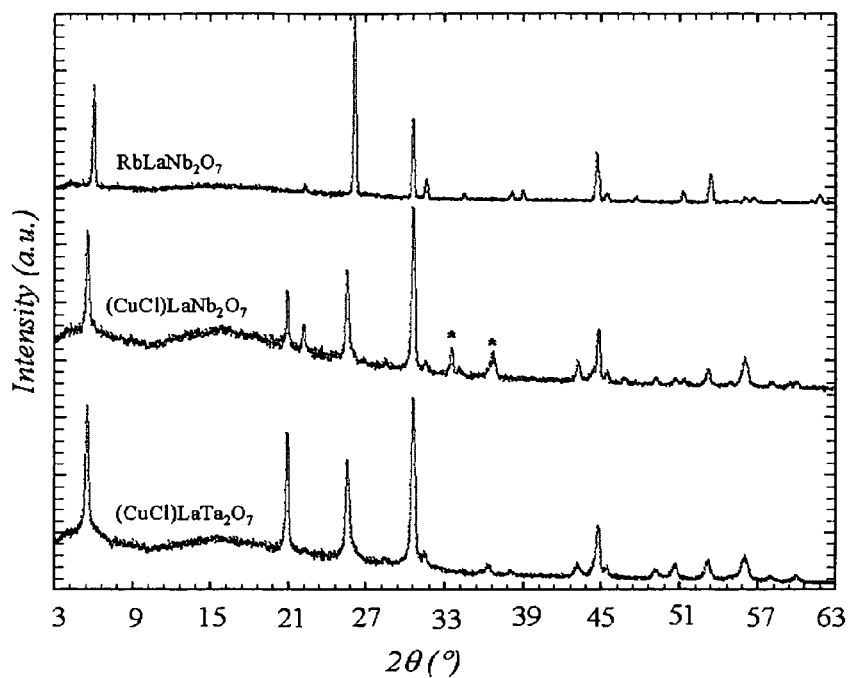
Figure 3. PXRD patterns for (CuCl)LaNb$_2$O$_7$ and (CuCl)LaTa$_2$O$_7$ along with parent DJ phase RbLaNb$_2$O$_7$ (* = CuO peaks)
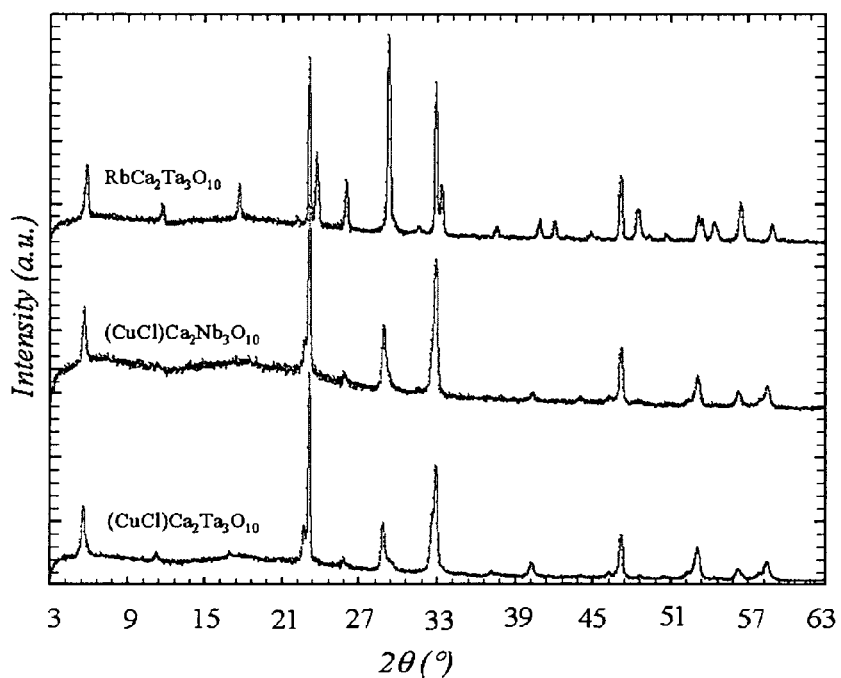
Figure 4. PXRD patterns for (CuCl)Ca$_2$Nb$_3$O$_{10}$ and (CuCl)Ca$_2$Ta$_3$O$_{10}$ along with parent DJ phase RbCa$_2$Ta$_3$O$_{10}$

SOLAR PHOTOCATALYSIS USING TRANSITION-METAL OXIDES COMBINING $D^0$ AND $D^6$ ELECTRON CONFIGURATIONS

RELATED APPLICATIONS

This application claims the benefit of U.S. Provisional Patent Application Ser. No. 60/709,533, Filed Aug. 19, 2005 the disclosure of which is incorporated by reference herein in its entirety.

FIELD OF THE INVENTION

The present invention concerns catalytic reactions and chemical compositions suitable for use with visible light.

BACKGROUND OF THE INVENTION

Numerous solids (>30) reportedly exhibit high efficiencies for photocatalysis of $H_2O$ (and generation of hydrogen) at ultraviolet wavelengths, including $NaTaO_3$ (56%; quantum yield), $Sr_2Nb_2O_7$ (23%), $La_2Ti_2O_7$ (27%), and $La_4CaTi_5O_{17}$ (20%). (Kato, H.; Kudo, A. *Catal. Lett.* 1999, 58(2,3), 153; Kudo, A. et al., *J. Phys. Chem. B* 2000, 104, 571; Kim, H. G. et al., *Catal. Lett.* 2003, 91, 193; Kim, H. G. et al., *Chem. Comm.* 1999, 1077). These are typically impregnated with co-catalysts such as Pt and $RuO_2$ to assist $H_2/O_2$ formation, and are then suspended and illuminated in $H_2O$. During the photocatalytic reaction several requirements must be met, including, a) the photon energy must be greater than the band gap, b) the excited electrons and holes must be separated, such as by the surface/electrolyte polarization, c) the conduction band must be higher than the reduction potential of $H_2O$ (0.0 eV) and the valence band lower than the oxidation potential of $H_2O$ (−1.23 eV) (i.e. absorbed light has $\lambda_{min}$<1000 nm), and d) the surfaces should be photostable. For optimum performance, the band gap should be small enough (~1.5-2.0 eV) to absorb a large fraction of the solar energy. However, while many metal-oxide solids have shown to be photostable (d) in aqueous solutions, it has proven challenging to lower their band gap to absorb a greater fraction of incoming sunlight while keeping the conduction band above the $H_2/H_2O$ redox couple (c) ("Energy Resources through Photochemistry and Catalysis (Ed.: M. Grätzel)", Academic Press, New York, 1983).

SUMMARY OF THE INVENTION

A first aspect of the invention is a catalytic or photocatalytic reaction system comprising an early transition metal (e.g., $Ta^{5+}$, $Nb^{5+}$, $Ti^{4+}$, or $W^{6+}$) octahedral-based structure of a catalyst or photocatalyst material, the improvement comprising including a specific late transition metal or metals (e.g., $Co^{3+}$, $Fe^{2+}$, $Ru^{2+}$, $Os^{2+}$, $Rh^{3+}$, $Ir^{3+}$, $Pd^{4+}$, or $Pt^{4+}$) with the early transition metal to form a solid solution or ordered layer material therewith so that a greater fraction of energy or visible light is absorbed by the photocatalytic reaction system.

A second aspect of the invention is, in a method of carrying out a catalytic reaction with a catalytic reaction system comprising an octahedral-based structure of a early transition metal catalyst material, the improvement comprising including a late transition metal with said early transition metal to form a solid solution or ordered layer material therewith so that a greater amount of energy is absorbed by the catalytic reaction system and the efficiency of the method is increased.

The catalytic reaction may be driven by any suitable energy, such as light, thermal, ultrasound or mechanical energy.

In some embodiments the octahedral-based material is of the Formula:

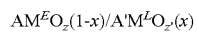

$$AM^EO_z(1-x)/A'M^LO_{z'}(x)$$

wherein:
A and A' are independently selected from the group consisting of Na, K, Rb, Cs, Mg, Ca, Sr, Ba, Sc, Y, and La;
$M^E$ is an early transition metal selected from the group consisting of $Ta^{5+}$, $Nb^{5+}$, $Ti^{4+}$, and $W^{6+}$;
$M^L$ is a late transition metal selected from the group consisting of $Co^{3+}$, $Fe^{2+}$, $Ru^{2+}$, $Os^{2+}$, $Rh^{3+}$, $Ir^{3+}$, $Pd^{4+}$, and $Pt^{4+}$;
z and z' represent the amount of oxygen; and
x is 0.1 or 0.01 to 0.9 or 0.99, representing a molar ratio range.

In some embodiments, the late transition metal is not $Co^{3+}$ when the early transition metal is $Nb^{5+}$; in some embodiments, the late transition metal is $Co^{3+}$ when the early transition metal is $Nb^{5+}$.

In some embodiments, the early transition metal is $Ta^{5+}$ and the late transition metal is $Co^{3+}$.

In some embodiments the system further comprises an aqueous liquid, with the octahedral-based material carried by or dispersed in the aqueous liquid.

In some embodiments the system is for the production of hydrogen and oxygen from water.

In some embodiments the system is improvement of a titanium dioxide photocatalytic coating system for cleaning spacecraft surfaces.

In some embodiments the system is improvement of a photocatalytic reaction system for water purification with a photocatalytic powder deposited with different isoelectric point material on the surface of the photocatalytic article.

In some embodiments the system is an improvement of a lanthanum-doped $NaTaO_3$ photocatalytic system for highly efficient water splitting into $H_2$ and $O_2$.

In some embodiments the system is an improvement of a photocatalytic system with $SrTiO_3$ and optionally other semiconductor photocatalysts for the fixation of carbon dioxide.

In some embodiments the system is an improvement of a photocatalytic system of an oxidizing agent and a polymer carrier with photocatalytic particles for decomposition of residual dyes in industrial wastewaters.

In some embodiments the system is an improvement of a photocatalytic system to prepare a niobic acid potassium photocatalyst by a hydrothermal process of niobium oxide and potassium-hydroxide water solution.

A further aspect of the present invention is a method of making an early transition metal octahedral-based structure as a photocatalyst material, the material including a late transition metal with said early transition metal to form an ordered layered material therewith; the method comprising:

reacting together (i) an early transition metal salt or oxide (e.g., salts or oxides of $Ta^{5+}$, $Nb^{5+}$, $Ti^{4+}$, or $W^{6+}$), (ii) a late transition metal salt or oxide (salts or oxides of $Co^{3+}$, $Fe^{2+}$, $Ru^{2+}$, $Os^{2+}$, $Rh^{3+}$, $Ir^{3+}$, $Pd^{4+}$, or $Pt^{4+}$), and (iii) a counterion selected from the group consisting of alkali metal, alkaline earth metal and rare earth metal salt or oxide (e.g., salts or oxides of Na, K, Rb, Cs, Mg, Ca, Sr, Ba, Sc, Y, or La); in either: (i) a molten salt flux in a flux synthesis reaction or (ii) a basic solution in a closed hydrothermal synthesis reaction; to produce the photocatalyst material.

The foregoing and other objects and aspects of the present invention are explained in greater detail in the drawings herein and the specification set forth below.

BRIEF DESCRIPTION OF THE DRAWINGS

FIG. 1. Energy band diagrams for $NaTaO_3$ (left), and for a combined $d^0$ and $d^6$ metal oxide (right). Late transition-metal d-orbital splittings and band energy requirements are shown.

FIG. 2. Diffuse reflectance data for the $(NaTaO_3)_{1-x}(LaCoO_3)_x$ series. Visible-light absorption increases with x, or Co.

FIG. 3. PXRD patterns for $(CuCl)LaNb_2O_7$ and $(CuCl)LaTa_2O_7$ along with parent DJ phase $RbLaNb_2O_7$ (*=CuO peaks).

FIG. 4. PXRD patterns for $(CuCl)Ca_2Nb_3O_{10}$ and $(CuCl)Ca_2Ta_3O_{10}$ along with parent DJ phase $RbCa_2Ta_3O_{10}$

DETAILED DESCRIPTION OF THE PREFERRED EMBODIMENTS

"Octahedral-based" structures of materials of the present invention include any material based on the condensation of octahedra, including but not limited to perovskite structure type materials, Ruddlesden-Popper structure type materials, Aurivillius structure type materials, and combinations thereof (such as layered structure type materials).

"Solid solution" material as used herein refers to a composition in which the two compounds are completely soluble in each other over a range of compositions and two or more atoms readily substitute for each other on a given lattice site. The solids therefore exhibit the same crystal structure for all compositions" (The Physics and Chemistry of Materials; Gersten & Smith). Solid solutions include substitutional and interstitial solid solutions; the solid solutions of the invention are preferably substitutional solid solutions. The solid solutions of the invention may be crystalline (including semicrystalline) or amorphous.

"Ordered layered" material as used herein refers to a crystal composition in which the two compounds (e.g., the early transition metal and the late transition metal) occupy separate and distinct layers in a uniform and repeating pattern throughout the crystal. Such ordered layer materials can be produced by flux synthesis or hydrothermal synthesis as described herein.

"Energy source" as used herein refers to any energy source that could potentially excite electrons and cause catalysis, including but not limited to: a) solar energy and light; b) thermal energy, c) ultrasound energy, and d) mechanical (tribological) energy, and combinations thereof.

"Early transition metals" in this invention include but are not limited to $Ta^{5+}$, $Nb^{5+}$, $Ti^{4+}$, and $W^{6+}$, and have d-orbitals potentially higher than the $H_2/H_2O$ redox couple.

"Late transition metals" in this invention include but are not limited to: $Co^{3+}$, $Fe^{2+}$, $Ru^{2+}$, $Os^{2+}$, $Rh^{3+}$, $Ir^{3+}$, $Pd^{4+}$, $Pt^{4+}$ and have $t_{2g}$ levels potentially lower than the $O_2/H_2O$ redox couple, as judged by redox and predominance diagrams. In addition, their large d-orbital splittings place the $e_g$ levels either above or equivalent to the early transition metal d-orbitals.

The disclosures of all United States patent references cited herein are to be incorporated by reference herein in their entirety.

Overview. In order to enable photocatalytic applications for use with visible light, this chemical strategy is based on having combinations of late transition metal ions with a large d-orbital splitting (>2.0 eV) together with early transition metals. Shown in FIG. 1, selected early transition-metal d-orbitals have conduction bands above the $H_2/H_2O$ redox couple, while the O p-orbitals fall far below the $O_2/H_2O$ couple. In our new approach, a filled d-orbital ($t_{2g}$ level is added just below the $O_2/H_2O$ couple to lower the band gap, and it is now possible for visible light to excite electrons from these $t_{2g}$ levels to the early transition-metal d-orbitals comprising the conduction band. Late transition metals have $t_{2g}$ levels potentially lower than the $O_2/H_2O$ redox couple, as judged by redox and predominance diagrams. In addition, their large d-orbital splittings place the $e_g$ levels either above or equivalent to the early transition metal d-orbitals. Early transition metals have d-orbitals potentially higher than the $H_2/H_2O$ redox couple. Thus, a combination of $d^0$ and $d^6$ transition metals in the solid effectively lowers the band gap to the visible region and maintains suitable energy positions with respect to both the $H_2/H_2O$ and $O_2/H_2O$ redox couples. This strategy also avoids partially filled or empty d-orbital states between the conduction and valence bands that could potentially function as competing electron-hole recombination centers.

Photocatalysts Systems. Chemical systems, and specific compositions, covered by this invention include all combinations of solid solutions, ordered layered materials, composites or other distinct metal-oxide phases containing $d^0$ and $d^6$ transition metals. For example, solid solutions or composites formed between the $d^0$ metal oxides $BaTiO_3$, $SrTiO_3$, $ATaO_3$ and $ANbO_3$ (A=Li, Na, K, Rb), with the $d^6$ metal oxides such as $LaM'O_3$ (M'=Co, Rh, Ir) or $BaPtO_3$. Additional examples include layered Aurivillius and Ruddlesden-Popper structure types, among others. This invention also covers the deposition of cocatalyst sites on the solid surfaces, such as Pt, NiO, and $RuO_2$, which would increase their lifetime or photocatalytic activity as demonstrated in the literature for ultraviolet-active photocatalysts.

Examples of solid compositions of the present invention include, but are not limited to, the following (where x=0.01 or 0.1 to 0.9 or 0.99 to give a range of molar ratios for each composition):

$LaCoO_3(1-x)/LiTaO_3(x)$;
$LaCoO_3(1-x)/NaTaO_3(x)$;
$LaCoO_3(1-x)/KTaO_3(x)$;
$LaCoO_3(1-x)/RbTaO_3(x)$;
$LaCoO_3(1-x)/LiNbO_3(x)$;
$LaCoO_3(1-x)/NaNbO_3(x)$;
$LaCoO_3(1-x)/KNbO_3(x)$;
$LaCoO_3(1-x)/RbNbO_3(x)$;
$LaRhO_3(1-x)/LiTaO_3(x)$;
$LaRhO_3(1-x)/NaTaO_3(x)$;
$LaRhO_3(1-x)/KTaO_3(x)$;
$LaRhO_3(1-x)/RbTaO_3(x)$;
$LaRhO_3(1-x)/LiNbO_3(x)$;
$LaRhO_3(1-x)/NaNbO_3(x)$;
$LaRhO_3(1-x)/KNbO_3(x)$;
$LaRhO_3(1-x)/RbNbO_3(x)$;
$LaCoO_3(1-x)/BaTiO_3(x)$;
$YCoO_3(1-x)/BaTiO_3(x)$;
$LaRhO_3(1-x)/BaTiO_3(x)$;
$YRhO_3(1-x)/BaTiO_3(x)$;
$LaCoO_3(1-x)/SrTiO_3(x)$;
$YCoO_3(1-x)/SrTiO_3(x)$;
$LaRhO_3(1-x)/SrTiO_3(x)$; and
$YRhO_3(1-x)/SrTiO_3(x)$.

Compounds of the foregoing can be made in accordance with known techniques, such as by combining each of the elements using a suitable starting source (e.g. a carbonate or oxide salt) and in stoichiometric ratios, and heating to ~800-

1500° C., for ~24 h or longer, with repeated grindings and heatings until the product forms (judged using x-ray diffraction).

In another example, hydrated forms of compounds of the invention can be prepared in accordance with the procedures described in Example 2 below, or variations thereof that will be apparent to those skilled in the art based upon the present disclosure.

In another example, compounds of the foregoing can be produced by the process of hydrothermal synthesis, as shown in Example 3 below, or variations thereof that will be apparent to those skilled in the art. See, e.g., U.S. Pat. Nos. 6,123,907; 5,910,298; 5,5635,155; 5,340,562; and 5,057,286. Reaction conditions are not critical. In general, the reactions are performed in a closed container at temperatures of 100 to 250° C. for a time of 12 to 72 hours in a basic aqueous solution (preferably a strong base such as sodium hydroxide or ammonium hydroxide, which may optionally be mixed with a cosolvent such as ethanol). Salts of the various reactant metals may be provided in any suitable form, such as hydroxides, nitrates, and chlorides.

In another example, compounds of the foregoing can be produced by the process of flux synthesis, or molten salt synthesis, as shown in Example 4 below (see, also), D. Porob and P. Maggard, *Journal of Solid State Chemistry* 179, 1727-1732 (2006); see also U.S. Pat. Nos. 6,409,938; 5,270,293; 4,746,396; and 4,534,956. Reaction conditions are not critical. In general, the reactions may be carried out in an open crucible at a temperature of 600 to 1100° C. for a time of one-half hour up to 48 hours in a molten salt flux (e.g., an alkali metal sulfate or nitrate flux). Salts of the various reactant metals may be provided in any suitable form, such as hydroxides, nitrates, and chlorides.

Known early/late transition metal solids are:

$La_{(1-x)}Na_{(x)}Co_{(1-x)}Nb_{(x)}O_3$ (only one that is a solid solution);

$Sr_2MRhO_6$ (M=Nb or Ta);

$Ba_2RhNbO_6$;

$SrLaCoNbO_6$;

$SrLaCoTaO_6$; and $A_2CoNbO_6$ (A=Sr, Ba).

The compounds and compositions of the invention preferably show enhanced energy absorption, as compared to the same compounds and compositions without the addition of the late transition metal. For example, compounds and compositions of the invention preferably show a light absorbance of at least about 10, 20, 30, 40, 50, 60, 70 or 80% of light at a wavelength of 340 nm, 440 nm, 540 nm, and/or 600 nm. (and most preferably show such absorbance at wavelengths of 340 through 600 nm).

Liquids in which the solid solutions or ordered layered material may be dispersed (e.g., in particulate or granular form) to form compositions of the invention may be aqueous, optionally including additional organic solvents, reactants or constituents such as methanol or ethanol. Such compositions may generally comprise, consist of or consist essentially of 0.01 or 0.1 to 5 or 10 percent by weight of solid solution or ordered layered material, with the remainder liquid.

Cleaning spacecraft surfaces by using photocatalytic coating with titanium dioxide. In one embodiment of the present invention, the systems and methods can be used for cleaning spacecraft surfaces. For instance, U.S. Pat. No. 6,537,379 to Vajo and Williamson discloses a photocatalytic coating comprising of titanium dioxide and certain titanates. The coating is applied to protect the critical external optical spacecraft surfaces from contamination with polymerized hydrocarbon films. The thickness of the coating is within the range of 5 Angstrom to 2 times $10^4$ Angstrom. The coating could be applied through several different methods such as sputtering, electron beam evaporation, or sol-gel processing. The process of cleaning the spacecraft surfaces starts from coating with a UV-photon, then oxidation of hydrocarbons adsorbed on the protected surfaces to prevent polymerization on the surfaces and evaporate safely into the environment. At orbital altitudes, a stream of $H_2O_2$ or oxygen is directed towards the surface to regenerate the titanium original form in the coating and restart the cleaning process. This system and the methods of use thereof, are modified by this invention described herein to better absorb a greater fraction of visible light.

Water purification by applying photocatalyst powder with a different isoelectric point material on the surface of the photocatalyst particle. In one embodiment of the present invention, the systems and methods can be used for efficiently purifying water. For instance, Japan Patent No. 2001149789 to Noguchi and Hashimoto et al illustrates an efficient water purification method by using photocatalyst powder to adsorb and quickly decompose the contaminated material with same sign charge as the photocatalyst powder. In order to overcome the electric repulsion between the same sign of surface charge, a material having an isoelectric point different from that of the photocatalyst is deposited on the surface of the photocatalyst particle. Preferred photocatalyst powder could be selected from, but not limited to, titanium oxide, strontium titanate or barium titanate. The deposited material could be chosen from, but not limited to, metal hydroxides or metal oxides such as aluminum oxide, magnesium oxide, thorium dioxide, zirconium dioxide, nickel oxide, or aluminum hydroxide. This system and the methods of use thereof, are modified by this invention described herein to better absorb a greater fraction of visible light.

Decomposition of residual dyes in industrial wastewaters by using polymer carrier with photocatalytic particles and an oxidizing agent. In one embodiment of the present invention, the systems and methods can be used for decomposition of residual dyes in industrial wastewaters. For instance, Japan Patent No. 2001038373 to Inoue and Yamanaka et al describes the application of a photocatalytic system of an oxidizing agent and a polymer carrier with photocatalytic particles to decolorize waste water and reduce the dissolved total-organic-carbon concentration by efficiently decomposing dye remaining in the waste water discharged from dye works or the like. The photocatalytic particles are fused thermally on the surface of the thermoplastic polymer carrier in a vertical direction to the surface of the carrier. The wastewater solution is irradiated with light, and the wavelength of the light (preferably <=380 nm) will cause electric charge separation of the photocatalyst. The applicable photocatalytic particle could be chosen from, but not limited to, titanium dioxide, strontium titanate, zirconium dioxide, niobium oxide, or tungstic oxide, etc. Preferably, the specific gravity of the photocatalyst carrier is 0.7-1.3 for efficiently treating the waste water by fluidized bed process, and the oxidizing agent is ozone-containing gas and hydrogen peroxide. This system and the methods of use thereof, are modified by this invention described herein to better absorb a greater fraction of visible light.

Highly efficient water splitting into $H_2$ and $O_2$ by using lanthanum-doped $NaTaO_3$ photocatalysts. In one embodiment of the present invention, the systems and methods can be used for highly efficient water splitting into $H_2$ and $O_2$. For example, a publication on *J. Am. Chem. Soc.* discloses that NiO-loaded $NaTaO_3$ doped with lanthanum showed a high photocatalytic activity for water splitting into $H_2$ and $O_2$ in a stoichiometric amount under UV irradiation. (see *J. Am. Chem. Soc.*, 125 (10), 3082-3089). The photocatalytic activity of NiO-loaded $NaTaO_3$ doped with lanthanum was 9 times higher than that of nondoped NiO-loaded $NaTaO_3$. The maximum apparent quantum yield of the $NiO/NaTaO_3$:La photocatalyst was 56% at 270 nm. The factors affecting the highly efficient photocatalytic water splitting were examined by using various characterization techniques. Electron microscope observations revealed that the particle sizes of NaTaO$_3$:La crystals (0.1-0.7 m) were smaller than that of the nondoped NaTaO$_3$ crystal (2-3 m) and that the ordered surface nanostructure with many characteristic steps was created by the lanthanum doping. The small particle size with a high crystallinity was advantageous to an increase in the probability of the reaction of photogenerated electrons and holes with water molecules toward the recombination. Transmission electron microscope observations and extended X-ray absorption fine structure analyses indicated that NiO cocatalysts were loaded on the edge of the nanostep structure of NaTaO$_3$:La photocatalysts as ultrafine particles. The H$_2$ evolution proceeded on the ultrafine NiO particles loaded on the edge while the O$_2$ evolution occurred at the groove of the nanostep structure. Thus, the reaction sites for H$_2$ evolution were separated from those of O$_2$ evolution over the ordered nanostep structure. The small particle size and the ordered surface nanostep structure of the NiO/NaTaO$_3$:La photocatalyst powder contributed to the highly efficient water splitting into H$_2$ and O$_2$. This system and the methods of use thereof, are modified by this invention described herein to better absorb a greater fraction of visible light.

Fixation of carbon dioxide by using a photochemical system with cadmium sulfide and other semiconductor photocatalysts. In one embodiment of the present invention, the systems and methods can be used for fixation of carbon dioxide. For example, a publication in Solar Energy discloses that, in the presence of semiconductor suspensions and colloids, aqueous carbon dioxide could be photochemically reduced. (see *Solar Energy* (1990), 45 (1), 27-33). The publication demonstrated the experiments results using ZnO, BaTiO$_3$, or SrTiO$_3$, dispersions. The product analysis of the publication showed the formation of formic acid formaldehyde, sometimes methanol or, in the presence of tetramethylammonium chloride, two-carbon products such as glyoxylic, acetic acids or sometimes acetaldehyde. In addition, product yields and photochemical yields were studied as a function of pH, solution composition, added sacrificial electron donors and catalysts, irradiation intensity and irradiation time. This system and the methods of use thereof, are modified by this invention described herein to better absorb a greater fraction of visible light.

Preparing a niobic acid potassium photocatalyst by a hydrothermal process of niobium oxide and potassium-hydroxide water solution. In one embodiment of the present invention, the systems and methods can be used for preparing a niobic acid potassium photocatalyst. For example, Japan Patent No. 2003126695 to Hayashi and Hakuta describes a method to prepare a potassium niobate photocatalyst having a high hydrogen gas generation speed. The photocatalyst is composed of nickel oxide-carried potassium niobate, and the basic structure is Nb$_2$O$_5$ and xK$_2$O-yNiO (x=0.6-1, y=0-0.5). The potassium niobate photocatalyst was prepared by treating nickel on potassium niobate. The potassium niobate was obtained by treating niobium oxide and aqueous potassium hydroxide solution at 300° C.-450° C. by photoreducing and calcining. This system and the methods of use thereof, are modified by this invention described herein to better absorb a greater fraction of visible light.

The present invention is explained in greater detail in the following non-limiting Examples.

Example 1

Optical and Photocatalytic Data for Two Mixed Ta(d$^0$) and Co(d$^6$) Solid Solutions: (NaTaO$_3$)$_{1-x}$(LaCoO$_3$)$_x$ and (KTaO$_3$)$_{1-x}$(LaCoO$_3$)$_x$ i. Syntheses: Presynthesized LaCoO$_3$ was intimately mixed and reacted with stochiometric quantities of Ta$_2$O$_5$ and Na$_2$CO$_3$ or K$_2$CO$_3$, at up to ~1100° C., to give (NaTaO$_3$)$_{1-x}$(LaCoO$_3$)$_x$ and (KTaO$_3$)$_{1-x}$(LaCoO$_3$)$_x$ perovskite-type solid solutions containing from 0% to 100% LaCoO$_3$. A total of ~15 different samples were prepared for testing this way, each containing a different Ta:Co ratio. Up to three regrindings and three reheatings were required. All products were monitored using powder X-ray diffraction techniques to ensure a complete reaction and mix of transition metals.

ii. Optical Absorption Data: The visible-light absorption of each sample was measured using UV-Vis diffuse reflectance techniques. Powdered samples of each product were mounted on a quartz slide with tape, and the optical absorption taken as a function of wavelength. These measurements, shown in FIG. 2 for (NaTaO$_3$)$_{1-x}$(LaCoO$_3$)$_x$, confirmed increasing visible-light absorption with increasing Co (d$^6$) transition metal concentration (i.e. x), with a band gap edge that is undetectable up to >750 nm. As NaTaO$_3$ by itself exhibits an ultraviolet band gap, the addition of Co d-orbitals has had the effect of lowering the band gap and increasing absorption in the visible region (arrow in FIG. 2), in agreement with the details of the invention described above (see FIG. 1). Similar trends in the optical absorption, i.e. diffuse reflectance data, have been found for the (KTaO$_3$)$_{1-x}$(LaCoO$_3$)$_x$ series.

iii. Photocatalytic Measurements: To measure the photocatalytic activities of these solids, 0, 1 and 5 wt % RuO$_2$ cocatalyst sites were added to their surfaces as a kinetic aid in H$_2$ and O$_2$ formation. This procedure has been published before. The photocatalytic activities of the (NaTaO$_3$)$_{1-x}$(LaCoO$_3$)$_x$ and (KTaO$_3$)$_{1-x}$(LaCoO$_3$)$_x$ compounds were measured under a solar-simulating arc-lamp in H$_2$O(1) and CH$_3$OH/H$_2$O (2) solutions, and which follow the below reactions, respectively:

$$H_2O \rightarrow \tfrac{1}{2}O_2 + H_2 \tag{1}$$

$$CH_3OH + H_2O \rightarrow CO_2 + 6H_2 \tag{2}$$

Thus, hydrogen is generated during both photocatalytic reactions, and results in the conversion of solar energy to chemical energy (hydrogen). The amount of solution decomposition, and therefore gas production, was determined volumetrically from sealed fused-silica containers that track changes in liquid levels. The presence of hydrogen in the products has been verified by an H$_2$-specific detector and also injection of products into a GC column. Under only visible-light illumination, copious amounts of gaseous bubbles formed in almost every case, and which lasted

TABLE 1

Measured rates (mmol · g$^{-1}$ · h$^{-1}$) for photocatalytic reactions in two mixed d$^0$ (Ta$^{5+}$)/d$^6$ (Co$^{3+}$) systems.

| System #1 | Photocatalytic rates in pure water[a] | | |
|---|---|---|---|
| (NaTaO$_3$)$_{1-x}$(LaCoO$_3$)$_x$ | 0% RuO$_2$ | 1% RuO$_2$ | 5% RuO$_2$ |
| x = 0.25 | 0.22 | 0.54 (7.3)[b] | 0.29 |
| x = 0.5 | 0.32 | 1.37 (10.21)[b] | 0.39 |
| x = 0.5 (48 hrs) | | 1.13 | |
| x = 0.75 | 0.16 | 0.42 | 0.24 |

| System #2 | Photocatalytic rates with 10% MeOH added[b] | | |
|---|---|---|---|
| (KTaO$_3$)$_{1-x}$(LaCoO$_3$)$_x$ | 0% RuO$_2$ | 1% RuO$_2$ | 5% RuO$_2$ |
| x = 0.25 | 0.84 | 1.92 | 1.02 |
| x = 0.5 | 1.82 | 3.99 | 1.62 |
| x = 0.5 (48 hrs) | | 3.68 | |

TABLE 1-continued

Measured rates (mmol · g$^{-1}$ · h$^{-1}$) for photocatalytic reactions in two mixed d$^0$ (Ta$^{5+}$)/d$^6$ (Co$^{3+}$) systems.

| | | | |
|---|---|---|---|
| x = 0.75 | 0.93 | 2.33 | 1.14 |
| x = 1.0 (pure LaCoO$_3$) | 0.68 | | |

[a]Catalyst: ~250 mg, pure water solution: ~50 ml, visible light ($\lambda_{cut-off}$<420 nm) of 250 W high-pressure mercury lamp, reacted for 24 h.
[b]Catalyst: ~250 mg, water solution (10% methanol): ~50 ml, visible light ($\lambda_{cut-off}$<420 nm) of 250 W high-pressure mercury lamp, reacted for 24 h.

from 3 hours to >24 hours, with ~4-5 hours being the average lifetime. Shown in Table 1, extremely high reaction rates of >0.5-1.0 mmol H$_2$/h·g, were exhibited in most cases with a turnover of ~100 (moles H$_2$/moles compound). In at least one case the photocatalytic reaction continued unabated for >48 h (for (KTaO$_3$)$_{1-x}$(LaCoO$_3$)$_x$, x=0.5 with 1 wt % RuO$_2$), at which point the experiment was stopped. Typically, the photocatalytic reactions were a factor of ten greater in the CH$_3$OH/H$_2$O solution versus the pure H$_2$O solution, with a highest recorded rate of ~10.21 mmol H$_2$/h·g (in parentheses in table) in the first 2-3 hours of reaction for the (NaTaO$_3$)$_{1-x}$(LaCoO$_3$)$_x$, for x=0.5 with 1 wt % RuO$_2$. Thus, these systems exhibited excellent visible-light responsivity for the photocatalytic production of hydrogen, and confirmed a suitable placement of the energy band levels with respect to the O$_2$/H$_2$O and H$_2$/H$_2$O redox couples, as described in the invention above (see FIG. 1). Sustained rates for >1,000 hours at these levels would likely surpass the stated DOE goal of 10% efficiency for a practical photocatalyst system for generating hydrogen, and further work is necessary to increase their activity lifetimes and develop their potential.

Example 2

Preparation Off Photocatalytically-Active Hydrated Forms of Amorphous Titania, TiO$_2$.nH$_2$O Synthesis. Amorphous and hydrated TiO$_2$ was prepared by dissolving a weighed amount of Titanium (IV) n-butoxide (2 g, 0.00588 mol; Alfa Aesar, 99+%) into either pure ethanol (2, 5, 10, or 20 ml), acetone (5 ml), hexane (5 ml), or tetrahydrofuran (5 ml). Each of these solutions was mixed for 10 min and aged at room temperature for 24-48 h, during which time all of the solvent had evaporated and an amorphous white powder was obtained. To remove the remaining organic species, each powder was re-dispersed in 20 ml of deionized water (1:100 solid/water ratio) and dried at 80° C. for 1 h to yield amorphous TiO$_2$.nH$_2$O powders labeled the TiO$_2$-A1 series. Another preparation of amorphous TiO$_2$ was performed by dissolving the Titanium (IV) n-butoxide into 3 ml of concentrated HCl, following by the dropwise addition of concentrated aqueous ammonia with vigorous stirring until the pH of the solution reached 14. The obtained precipitate was filtered and washed in water repeatedly until no traces of AgCl precipitate occurred upon addition of 0.5M AgNO$_3$. The sample washing is critical to remove surface Cl$^-$ ions which can suppress photocatalytic activity. This product was dried at 80° C. and labeled TiO$_2$-A2.

Results And Discussion. Two different types of synthetic preparations of amorphous hydrated TiO$_2$.nH$_2$O were investigated, using either a slow evaporation of a solvent containing Ti(n-butoxide)$_4$ (TiO$_2$-A1 series) or its rapid precipitation from a concentrated HCl solution (TiO$_2$-A2). Discussion of the TiO$_2$-A1 series will focus on the results obtained using ethanol as the solvent, as the data obtained from alternative solvents were closely similar. Prior to washing, the samples show a large weight loss of 38% owing to the presence of organic groups (ethanol/butanol). After washing, the TiO$_2$-A1 samples all exhibited a large ~19% weight loss (1b) extending from 30-450° C., corresponding to the formula TiO$_2$.H$_2$O (n=1.04). The weight loss of absorbed water in TiO$_2$-A2 was a lower 9.9%, and corresponded roughly to TiO$_2$.½H$_2$O (n=0.49). Weight losses in this temperature range owes to the loss of surface water and hydroxyl groups, with the final product being the crystallization of TiO$_2$. Also, this weight loss remained reversible upon reimmersion in water until the temperatures at which the TiO$_2$ crystallizes. For example, approximately 52.2% of the original water content is removed by heating to 80° C. for 24 h, and this entire amount reabsorbed without any crystallization of anatase TiO$_2$ (see Supplementary Information). FT-IR measurements (not shown) indicate more intense. O—H absorption peaks in TiO$_2$-A1 compared to that for TiO$_2$-A2, as expected from the larger amounts of absorbed water in TiO$_2$.H$_2$O versus TiO$_2$.½H$_2$O. The significance of high amounts of surface hydroxyl groups for the photocatalytic activity of amorphous ZrO$_2$ has been cited previously [H. Kominami, K. et al., J. Mater. Chem. 11 (2001) 604]. SEM analyses (not shown) of TiO$_2$-A1 reveal increasing particle sizes and aggregation for increasing amounts of ethanol used in the preparation step. The larger particles result from the increased time for ethanol evaporation, but the different sizes do not effect the total amount of absorbed water found after washing with water. These particles are amorphous in nature and disperse into ultrafine particles upon washing with water.

Powder X-ray diffraction (PXRD) data were taken on TiO$_2$-A1 and also after its calcination at increasing temperatures of 100-1000° C. No significant diffraction was detected in the samples prepared at 25° C. or dried at 80° C., confirming the expected amorphous character of these solids (data not shown). Each also remained amorphous after loading with 0.5-5.0 wt % surface Pt and after photocatalytic reactions for >24 h. The PXRD of the TiO$_2$-A1 samples calcined at 300° C. also remained nearly featureless, but which exhibit a very weak emergence of diffraction peaks corresponding to crystalline anatase. Broad diffraction peaks for the anatase structure type appear at 400° C. and correspond to crystallite sizes of ~9.3 nm, as calculated from the Debye-Scherrer equation [H. Klug, L. E. Alexander, "X-ray Diffraction Procedures", 2$^{nd}$ ed; John Wiley and Sons, Inc.: New York, 1974]. Previous reports on the synthesis of nanocrystalline TiO$_2$ are consistent with these results [B. Ohtani, Y. Ogawa, S. I. Nishimoto, J. Phys. Chem. B 101 (1997) 3746]. At the higher temperatures of 700° C. and 1000° C., shown in 4e and 4f, the PXRD patterns correspond to a mixture of anatase and rutile or of rutile alone, respectively. Thus, TiO$_2$-A1 follows the expected transformation from amorphous to anatase to rutile forms of TiO$_2$ with increasing temperatures, Optical Properties and Photocatalytic Measurements. Optical band gaps of the TiO$_2$-A1 and TiO$_2$-A2 samples were calculated from their UV-Vis diffuse reflectance spectra, shown in FIG. 5. The TiO$_2$-A1 samples have a band gap of ~3.4 eV, and which is slightly smaller than that of TiO$_2$-A2 at ~3.5 eV. The onset of the absorption-edge for the samples calcined at 80, 400, 700, and 1000° C. was 352.6 nm (band gap=3.5 eV), 374.8 nm (3.31 eV), 392.9 nm (3.16 eV) and 410.4 nm (3.02 eV) respectively. Metal oxides typically show a decreased band-gap size with increasing particle size or with a change in phase, such as from amorphous to anatase to rutile [R. S. Davidson, et al., J. Photochem. 24 (1984) 27]. The band gap sizes reach a maximum in the amorphous samples, and which likely leads to higher conduction band levels for the reduction of water. For example, larger crystals of anatase $TiO_2$ require n-type doping to be photocatalytically active, while the rutile form has the smallest band gap and is inactive. The nanocrystalline and amorphous hydrated forms $TiO_2$ therefore do not suffer from this limitation, and which makes high rates of $H_2$ evolution possible.

The photocatalytic activities of all samples were tested in aqueous (20%) methanol solutions under band gap illumination, wherein the photoexcited electrons function as the reductants of water to give $H_2$ and the sacrificial methanol reacts rapidly with the photoexcited holes at the surface to give $CO_2$. The net reaction is: $CH_3OH(aq)+H_2O(l) \rightarrow CO_2(g)+3H_2(g)$. Photocatalytic reactions in aqueous methanol are used to measure the rate of $H_2$ formation without the concomitant 4-electron oxidation of $H_2O$ to $O_2$. The latter oxidation can be assisted by a $RuO_2$ surface cocatalyst [T. Kawai, T. Sakata, Chem. Phys. Lett. 72 (1980) 87]. Because the deposition of the $RuO_2$ cocatalyst requires high temperatures (>300° C.) which would crystallize the amorphous $TiO_2$, the current studies were limited to using sacrificial methanol and a Pt cocatalyst. In examining $H_2$ evolution versus time for $TiO_2$-A1 with 0 wt % and 0.5 wt % Pt cocatalyst (not shown), the amount of gas produced increased linearly in all samples in the $TiO_2$-A1 series (prepared from either ethanol, acetone, THF or hexane), with calculated rates of 1,100-1,200 $\mu mol \cdot h^{-1}\ g^{-1}$ using 0.5 wt % Pt cocatalyst, and lower rates of 250-350 $\mu mol \cdot h^{-1}\ g^{-1}$ using no cocatalyst. The optimum amount of Pt cocatalyst was found to be 0.5 wt %, and gave rates 3.3 times higher than similar samples with no cocatalyst. By comparison, the maximum photocatalytic rates for $H_2$ production of the $TiO_2$-A2 samples were a much lower 170 $\mu mol \cdot h^{-1}\ g^{-1}$ with no Pt cocatalyst, and only a moderately higher rate of 210 $\mu mol \cdot h^{-1}\ g^{-1}$ for 0.5 wt % Pt. These rates are from half to five times less than in $TiO_2$-A1, and shows the Pt cocatalyst has little effect on its activity. The photocatalytic activity of $TiO_2$ samples calcinated at 80-1000° C. shows a maximal rate at 400° C. that is ~5.7 times higher than amorphous hydrated $TiO_2$-A1, and is associated with the onset of crystallization of anatase (not shown). At 1000° C. negligible photocatalytic activity is observed, and is related to the conversion of anatase to rutile $TiO_2$. The photocatalytic rates for crystalline anatase increase by a factor of up to seventeen with the loading of 5 wt % Pt cocatalyst [T. Kawai, T. Sakata, *J. Chem. Soc. Chem. Comm.* 15 (1980) 694].

Example 3

Hydrothermal Synthesis of Photocatalytic $SrTiO_3$-Coated $Fe_2O_3$ and $BiFeO_3$ To our knowledge no composite system has been reported whereby a small-bandgap metal oxide, such as $Fe_2O_3$ or $BiFeO_3$, has been tested as a visible-light sensitizer in a photocatalytic material such as $SrTiO3$. Described herein (and also in J. Luo and P. Maggard, *Adv. Mater.* 2006, 18, 514-517) are the results of a new low-temperature synthesis of a crystalline $SrTiO_3$ coating onto either $Fe_2O_3$ or $BiFeO_3$ particles, as well as the characterization of their particle sizes/morphologies, optical absorption, and photocatalytic properties.

Both $Fe_2O_3$ and $BiFeO_3$ were dispersed separately in ethanol in an ultrasonic bath, added to a $HNO_3/H_2O/CH_3CH_2OH$ solution containing $TiO_2$(sol) and aqueous $Sr^{2+}$, and slowly precipitated with 0.1 M NaOH base to a final pH of 13. The solutions were filtered and heated to 240° C. under hydrothermal conditions to crystallize the $SrTiO_3$ coating, at a 6:1 shell/core molar ratio. The $Fe_2O_3/SrTiO_3$ and $BiFeO_3/SrTiO_3$ products were investigated by X-ray powder diffraction (INEL CPS 120), X-ray photoelectron spectroscopy (Riber LAS 3000), scanning electron microscopy (JEOL JEM 6300), and UV-vis diffuse reflectance spectroscopy (Cary 3E). The photodecomposition of $H_2O$ was measured under full solar spectrum illumination and also visible radiation (Oriel Arc Lamp, 250 W; Visible cutoff filter $\epsilon$ 420 nm).

The powder X-ray diffraction (PXRD) of the $SrTiO_3$-coated $BiFeO_3$ and $Fe_2O_3$ products confirmed the presence of the characteristic peaks for $Fe_2O_3$, $BiFeO_3$, and $SrTiO_3$ in each of their respective systems.

Scanning electron microscopy (SEM) images of the products reveal that the coated $Fe_2O_3$ particles consist of much smaller, $\leq 100$ nm, irregular particles, compared to the roughly spherical and ~100-200 nm particles for coated BiFeO3. Powdered $Fe_2O_3$, with irregular geometries and an average size of ~23 nm, was used as received, while $BiFeO_3$ was presynthesized hydrothermally with roughly spherical particle sizes of ~10-100 nm. The final particle sizes in each system therefore differ because of the size of the starting coated materials.

The UV-vis diffuse reflectance was measured for each $SrTiO_3$-coated system as well as for simple mechanical mixtures of the same molar ratio of 6:1. The characteristic absorption edges for the solids in each system are apparent, at 600 nm for Fe2O3 and BiFeO3 (bandgap of 2.1 eV) and at 390 nm for $SrTiO_3$ (bandgap of 3.2 eV), in agreement with previously reported values. However, the $SrTiO_3$-coated $BiFeO_3$ and $Fe_2O_3$ materials show an increased absorption between 375 and 550 nm compared to the mechanical mixtures.

To facilitate comparisons with existing photocatalytic data on $SrTiO_3$, the photodeposition of a Pt surface cocatalyst (0.2 wt.-%) was conducted, similar to previous reports, which aids in surface H2 formation. In addition, $CH_3OH$ has typically been employed as a hole scavenger in solution, thereby generating $CO_2$ as the photo-oxidation product rather than O2, so that the rate of H2 formation is measured without the associated O2 formation. The formation of the photo-oxidation products ($O_2/CO_2$) occurs at surface sites which are separated from H2 formation, thereby restricting $H_2/O_2$ recombination. Both $SrTiO_3$-coated systems exhibited visible-light photocatalytic activity at about ½ to ⅓ the UV rates, while pure and Fe-doped $SrTiO_3$ materials exhibit little or no detectable visible-light activity.

Example 4

Flux Assisted Rapid Synthesis of Layered Perovskite Oxyhalides: $(CuCl)LaM_2O_7$ and $(CuCl)Ca_2M_3O_{10}$ (M=Nb, Ta)

This example describes molten flux method for synthesis of $(CuCl)LaNb_2O_7$ and $(CuCl)LaTa_2O_7$. This method was also applied to n=3 DJ phases, $RbCa_2M_3O_{10}$ (M=Nb, Ta) and the results from these studies are also presented.

Parent compounds belonging to the Dion-Jacobson (DJ) series of layered perovskites, $RbLaM_2O_7$ and $RbCa_2M_3O_{10}$ (M=Nb, Ta) were synthesized by standard high-temperature solid-state reaction methods according to the literature. The compounds $RbLaNb_2O_7$,[10] $RbLaTa_2O_7$,[11] $RbCa_2Nb_3O_{10}$,[12] and $RbCa_2Ta_3O_{10}$,11 were prepared from $Rb_2CO_3$ (Alfa, 99%), $Ca(NO_3)_2 \cdot 4H_2O$ (Fisher, 99%), $La_2O_3$ (Alfa, 99.99%, preheated at 1050° C. for 12 h), $Nb_2O_5$ (Alfa, 99.9985%) and $Ta_2O_5$ (Alfa, 99.993%). Starting mixtures with appropriate stoichiometries were ground together and heated in alumina boats at 850° C./12 h, 1050° C./24 h ($RbLaNb_2O_7$); 1100° C./4 h ($RbLaTa_2O_7$); 1100° C./12 h ($RbCa_2Nb_3O_{10}$ and $RbCa_2Ta_3O_{10}$). A 50% molar excess of $Rb_2CO_3$ (25% for RbLaNb$_2$O$_7$) was used to compensate for the loss of the oxide due to volatilization. The products were then washed thoroughly with distilled water to remove the excess alkali carbonates/oxides and dried overnight at 120° C.

(CuCl)LaNb$_2$O$_7$ and (CuCl)LaTa$_2$O$_7$ were prepared by a single-step low-temperature ion exchange reaction between the parent DJ phases and cupric chloride dihydrate, CuCl$_2$.2H$_2$O (Alfa, 99%). The parent materials were ground thoroughly with a 2-fold molar excess of the cupric halide and later mixed with LiNO$_3$/KHSO$_4$/KNO$_3$ salts (molar ration 1:2:20). The reactant mixtures were heated at 300-400° C. for 1-5 h with LiNO$_3$/KNO$_3$ flux or 300° C. for 1 h with KHSO$_4$ flux. The samples were then washed with copious amounts of distilled water to remove the excess cupric halides, flux and RbCl byproducts. The final products were dark green (CuCl) LaNb$_2$O$_7$ and green (CuCl)LaTa$_2$O$_7$. Analyses of chemical composition were carried out by energy-dispersive X-ray spectroscopy (EDS) using a Hitachi S-3200 scanning electron microscope equipped with an EDAX microanalytical system. Structural characterization was made by powder X-ray diffraction. High-resolution PXRD data were collected on INEL diffractometer using Cu K$\alpha_1$ ($\lambda$=1.54056 Å) radiation from sealed tube X-ray generator (35 kV, 30 mA) in transmission mode using a curved position sensitive detector (CPS120). Unit cell parameters were refined by Le Bail fit[13] using Fullprof[14] program.

(CuCl)LaNb$_2$O$_7$ and (CuCl)LaTa$_2$O$_7$ were obtained in pure form at 300° C. with reaction duration of 3 h and 1 h respectively using LiNO$_3$ as flux. When the temperature (>300° C.) or the reaction time (>1 h) is increased, along with the formation of these compounds an impurity phase of CuO also appears in product mixture. However, CuO can be easily removed my treatment with dilute HCl and a pure product can be isolated. With KHSO$_4$, (CuCl)LaTa$_2$O$_7$ is readily formed at 300° C. in 1 h, but under similar reaction conditions (CuCl) LaNb$_2$O$_7$ could not be synthesized. As is typical for metal halide insertion reaction, the perovskite hosts were found to significantly expand in 'c' relative to the parent phases. The PXRD patterns for the synthesized compounds are shown in FIG. 3. The formation of pure (CuCl)LaNb$_2$O$_7$ and (CuCl) LaTa$_2$O$_7$ phases is clearly evident from the PXRD patterns. The refined lattice parameters for all the phases are given in Table 2 along with the cell parameters for the parent phases. The cell parameters are consistent with the ones reported in the literature. The EDAX results also showed good agreement, however trace amount of Rb were detected, which is often the case in many metathesis reactions.[7]

In order to extend this methodology to other series of DJ phases, host RbCa$_2$M$_3$O$_{10}$ (M=Nb, Ta) compounds were studied for metal halide insertion reactions under similar reaction conditions. With LiNO$_3$ as flux, the (CuCl) Ca$_2$Nb$_3$O$_{10}$ phase was obtain in pure form at 300° C. with in 2-3 h of reaction duration. The (CuCl)Ca$_2$Ta$_3$O$_{10}$ phase was obtained along with impurity of host phase even after long reaction durations of up to 24 h. Both the phases were green in color. Using KHSO$_4$ as flux at 300° C., (CuCl)Ca$_2$Ta$_3$O$_{10}$ was obtained in pure form in 1 h. Attempts to synthesize (CuCl)Ca$_2$Nb$_3$O$_{10}$ under similar conditions did not succeed. This results are similar to the one observed in the case of RbLaM$_2$O$_7$. The PXRD patterns for these compounds are shown in FIG. 4. The short reaction duration in flux method is likely due to facile diffusion of the Rb and CuCl species within molten flux. When KNO$_3$ flux was used for these reactions at 350° C./1 h, all the phases, except (CuCl) LaNb$_2$O$_7$ were accompanied by small amounts of parent DJ phases in addition to CuO impurity. Prolonged reaction duration of up to 2-3 h was not helpful in fully transforming the parent DJ phase.

TABLE 2

Refined unit cell parameters for parent DJ compounds and exchange products

| Compound | A' | a (Å) | c (Å) | Volume (Å$^3$) |
|---|---|---|---|---|
| ALaNb$_2$O$_7$ | Rb | 3.8827 (3) | 11.0137 (9) | 166.03 (2) |
| | CuCl | 3.8839 (4) | 11.7059 (15) | 176.58 (3) |
| ALaTa$_2$O$_7$ | Rb | 3.8788 (3) | 11.1023 (15) | 167.03 (3) |
| | CuCl | 3.8791 (4) | 11.7133 (18) | 176.26 (4) |
| ACa$_2$Nb$_3$O$_{10}$ | Rb | 3.8662 (3) | 14.9293 (13) | 223.16 (3) |
| | CuCl | 3.8545 (4) | 15.6305 (23) | 232.23 (5) |
| ACa$_2$Ta$_3$O$_{10}$ | Rb | 3.8572 (2) | 15.0505 (13) | 223.92 (3) |
| | CuCl | 3.8517 (3) | 15.6672 (18) | 232.43 (4) |

The present study demonstrates that 2D copper halide networks can be assembled within a variety of DJ type perovskites using flux method in relatively very short reaction durations.

REFERENCES (1) (a) Ruddlesden, S. N.; Popper, P. *Acta Crystallogr.* 1957, 10, 538. (b) Ruddlesden, S. N.; Popper, P. *Acta Crystallogr.* 1958, 11, 54.
(2) (a) Dion, M. et al. *Mater. Res. Bull.* 1981, 16, 1429. (b) Dion, M. et al., *ReV. Chim. Min.* 1984, 21, 92. (c) Jacobson, A. J. et al., *Inorg. Chem.* 1985, 24, 3729.
(3) (a) Machida, M. et al., *J. Phys. Chem. B* 2005, 109, 7801. (b) Takata, T. et al., *J. Photochem. Photobiol.* 1997, 106, 45. (c) Machida, M. et al., *Chem. Mater.* 2000, 12, 812. (d) Shimizu, K. et al., *Phys. Chem. Chem. Phys.* 2004, 6, 1064.
(4) Schaak, R. E and Mallouk, T. E. *Chem. Mater.* 2002, 14, 1455.
(5) (a) Gondrand, M.; Joubert, J. C.; *Rev. Chim. Miner.* 1987 24 33. (b) Schaak, R. E.; Mallouk, T. E. *J. Am. Chem. Soc.* 2000, 122, 2798. (c) Hyeon, K. A.; Byeon, S. H.; *Chem. Mater.* 1999, 11, 352. (d) Kim, S. Y. et al., *Chem. Mater.* 2002, 14, 1643. (e) Gopalakrishnan, J. et al., *J. Am. Chem. Soc.* 2000, 121, 6237.
(6) (a) Mahler, C. H. et al., *Mater. Res. Bull.* 1998, 33, 1581. (b) Cushing, B. L.; Wiley, J. B. *Mater. Res. Bull.* 1999, 34, 271.
(7) (a) Kodenkandath, T. A. et al., *J. Am. Chem. Soc.* 1999, 121, 10743 (b) Kodenkandath, T. A. et al., *Inorg. Chem.* 2001, 40, 710 (c) Viciu, L. et al., *Inorg. Chem.* 2002, 41, 3385.
(8) (a) Matsuda, T. et al., *J. Mater. Chem.* 1994, 4, 955. (b) Viciu, L. et al., *Mater. Res. Bull.* 2004, 39, 2147.
(9) Sayama, K. et al., *J. Photochem. and Photobio. A: Chemistry* 2002, 148, 71
(10) Gopalakrishnan, J. et al., *Mater. Res. Bull.* 1987, 22, 413.
(11) Toda, K. et al., *Solid State Ionics* 1997, 93, 177.
(12) Dion, M. et al., *Mater. Res. Bull.* 1981, 16, 1429.
(13) Le Bail A, et al., *Mat Res Bull.* 1988, 23, 447.
(14) Rodriguez-Carvajal, *J. Fullprof2k*, Version 3.4 (November 2005). Laboratoire Leon Brillouin (CEA/CNRS), CEA-Saclay, 91191 Gif-sur-Yvette Cedex, France.

The foregoing is illustrative of the present invention, and is not to be construed as limiting thereof. The invention is defined by the following claims, with equivalents of the claims to be included therein.

That which is claimed is:

1. In a photocatalytic reaction system comprising an early transition metal octahedral-based structure of a photocatalyst material, the improvement comprising including a late transition metal with said early transition metal to form a said solid solution or ordered layer material therewith so that a greater fraction of visible light is absorbed by said photocatalytic reaction system;

subject to the proviso that said late transition metal is not $Co^{3+}$ when said early transition metal is $Nb^{5+}$ when said photocatalyst is a solid solution.

2. The system of claim 1, wherein said early transition metal is selected from the group consisting of $Ta^{5+}$, $Nb^{5+}$, $Ti^{4+}$, and $W^{6+}$.

3. The system of claim 1, wherein said late transition metal is selected from the group consisting of $Co^{3+}$, $Fe^{2+}$, $Ru^{2+}$, $Os^{2+}$, $Rh^{3+}$, $Ir^{3+}$, $Pd^{4+}$, and $Pt^{4+}$.

4. The system of claim 1, wherein said early transition metal is $Ta^{5+}$ and said late transition metal is $Co^{3+}$.

5. The system of claim 1, wherein said octahedral-based material has the Formula:

$$AM^{E}O_{z}(1-x)/A'M^{L}O_{z'}(x)$$

wherein:
A and A' are independently selected from the group consisting of Na, K, Rb, Cs, Mg, Ca, Sr, Ba, Sc, Y, and La;
$M^{E}$ is an early transition metal selected from the group consisting of $Ta^{5+}$, $Nb^{5+}$, $Ti^{4+}$, and $W^{6+}$;
$M^{L}$ is a late transition metal selected from the group consisting of $Co^{3+}$, $Fe^{2+}$, $Ru^{2+}$, $Os^{2+}$, $Rh^{3+}$, $Ir^{3+}$, $Pd^{4+}$, and $Pt^{4+}$;
z and z' represent the amount of oxygen; and
x is 0.01 to 0.99 representing a molar ratio range.

6. The system of claim 1, wherein said solid solution is a substitutional solid solution.

7. The system of claim 1, further comprising an aqueous liquid, with said solid solution carried by or dispersed in said aqueous liquid.

8. The system of claim 1, wherein said system is for the production of hydrogen and oxygen from water.

9. The system of claim 1, wherein said system is a titanium dioxide photocatalytic coating system for cleaning spacecraft surfaces.

10. The system of claim 1, wherein said system is a photocatalytic reaction system for water purification with a photocatalytic powder deposited with different isoelectric point material on the surface of the photocatalytic article.

11. The system of claim 1, wherein said system is a lanthanum-doped $NaTaO_3$ photocatalytic system for highly efficient water splitting into $H_2$ and $O_2$.

12. The system of claim 1, wherein said system is a photocatalytic system with $SrTiO_3$ and other semiconductor photocatalysts for the fixation of carbon dioxide.

13. The system of claim 1, wherein said system is a photocatalytic system of an oxidizing agent and a polymer carrier with photocatalytic particles for decomposition of residual dyes in industrial wastewaters.

14. The system of claim 1, wherein said system is a photocatalytic system to prepare a niobic acid potassium photocatalyst by a hydrothermal process of niobium oxide and potassium-hydroxide water solution.

15. The system of claim 1, wherein said octahedral-based structure of a material is an ordered layer material.

16. The system of claim 15, wherein said ordered layer material is produced by the process of flux synthesis or hydrothermal synthesis.

17. In a method of carrying out a catalytic reaction with a catalytic reaction system comprising an octahedral-based early transition metal catalyst material, the improvement comprising including a late transition metal with said early transition metal to form a solid solution or ordered layer material therewith so that a greater amount of energy is absorbed by said catalytic reaction system and the efficiency of said method is increased.

18. The method of claim 17, wherein said catalytic reaction is driven by light, thermal, ultrasound or mechanical energy.

19. The method of claim 17, subject to the proviso that said late transition metal is $Co^{3+}$ and said early transition metal is $Nb^{5+}$.

20. The method of claim 17, wherein said early transition metal is selected from the group consisting of $Ta^{5+}$, $Nb^{5+}$, $Ti^{4+}$, and $W^{6+}$.

21. The method of claim 17, wherein said late transition metal is selected from the group consisting of $Co^{3+}$, $Fe^{2+}$, $Ru^{2+}$, $Os^{2+}$, $Rh^{3+}$, $Ir^{3+}$, $Pd^{4+}$, and $Pt^{4+}$.

22. The method of claim 17, wherein said early transition metal is $Ta^{5+}$ and said late transition metal is $Co^{3+}$.

23. The method of claim 17, wherein said octahedral-based structure of a material has the Formula:

$$AM^{E}O_{z}(1-x)/A'M^{L}O_{z'}(x)$$

wherein:
A and A' are independently selected from the group consisting of Na, K, Rb, Cs, Mg, Ca, Sr, Ba, Sc, Y, and La;
$M^{E}$ is an early transition metal selected from the group consisting of $Ta^{5+}$, $Nb^{5+}$, $Ti^{4+}$, and $W^{6+}$;
$M^{L}$ is a late transition metal selected from the group consisting of $Co^{3+}$, $Fe^{2+}$, $Ru^{2+}$, $Os^{2+}$, $Rh^{3+}$, $Ir^{3+}$, $Pd^{4+}$, and $Pt^{4+}$;
z and z' represent the amount of oxygen; and
x is 0.01 to 0.99 representing a molar ratio range.

24. The method of claim 17, wherein said solid solution is a substitutional solid solution.

25. The method of claim 17, further comprising an aqueous liquid, with said solid solution carried by or dispersed in said aqueous liquid.

26. The method of claim 17, wherein said octahedral-based photocatalyst is dispersed in or carried by an aqueous liquid.

27. The method of claim 17, wherein said method is a method for the production of oxygen and hydrogen from water.

28. The method of claim 17, wherein said method is a method for cleaning spacecraft surfaces by using photocatalytic coating with titanium dioxide.

29. The method of claim 17, wherein said method is a method for purifying water by using a photocatalytic powder deposited with different isoelectric point material on the surface of the photocatalytic particle.

30. The method of claim 17, wherein said method is a method for highly efficient water splitting into $H_2$ and $O_2$ with lanthanum-doped $NaTaO_3$ photocatalysts.

31. The method of claim 17, wherein said method is a method for fixation of carbon dioxide with $SrTiO_3$ and other semiconductor photocatalysts.

32. The method of claim 17, wherein said method is a method for decomposition of residual dyes in industrial wastewater by applying an oxidizing agent and a polymer carrier with photocatalytic particles.

33. The method of claim 17, wherein said method is a method for preparing a niobic acid potassium photocatalyst by a hydrothermal process of niobium oxide and potassium-hydroxide water solution.

34. The method of claim 17, wherein said octahedral-based structure of a material is an ordered layer material.

35. The system of claim 17, wherein said ordered layer material is produced by the process of flux synthesis or hydrothermal synthesis.

36. A method of making an early transition metal octahedral-based structure as a photocatalyst material said material including a late transition metal with said early transition metal to form a solid solution or ordered layer material therewith; said method comprising:

reacting together (i) an early transition metal salt or oxide, (ii) a late transition metal salt or oxide; and (iii) a counterion selected from the group consisting of alkali metal, alkaline earth metal and rare earth metal salt or oxide;
in either (i) a molten salt flux in a flux synthesis reaction or (ii) a basic solution in a closed hydrothermal synthesis reaction;
to produce said photocatalyst material.

37. The method of claim 36, wherein said early transition metal salt or oxide is is selected from the group consisting of salts or oxides of $Ta^{5+}$, $Nb^{5+}$, $Ti^{4+}$, and $W^{6+}$.

38. The method of claim 36, wherein said late transition metal salt or oxide is selected from the group consisting of salts or oxides of $Co^{3+}$, $Fe^{2+}$, $Ru^{2+}$, $Os^{2+}$, $Rh^{3+}$, $Ir^{3+}$, $Pd^{4+}$, and $Pt^{4+}$.

39. The method of claim 36, wherein said counterion is selected from the group consisting of salts or oxides of Na, K, Rb, Cs, Mg, Ca, Sr, Ba, Sc, Y, and La.

\* \* \* \* \*

Disclaimer

7,763,149 — Paul A. Maggard, Holly Springs, NC, SOLAR PHOTOCATALYSIS USING TRANSITION-METAL OXIDES COMBINING D0 AND D6 ELECTRON CONFIGURATIONS. Patent dated July 27, 2010. Disclaimer filed by the assignee, North Carolina State University.

Hereby enters this disclaimer to claims 1-39 of said patent.

*(Official Gazette* January 4, 2011)